(No Model.)
W. TRITCH.
GATE.
No. 353,550.  Patented Nov. 30. 1886.
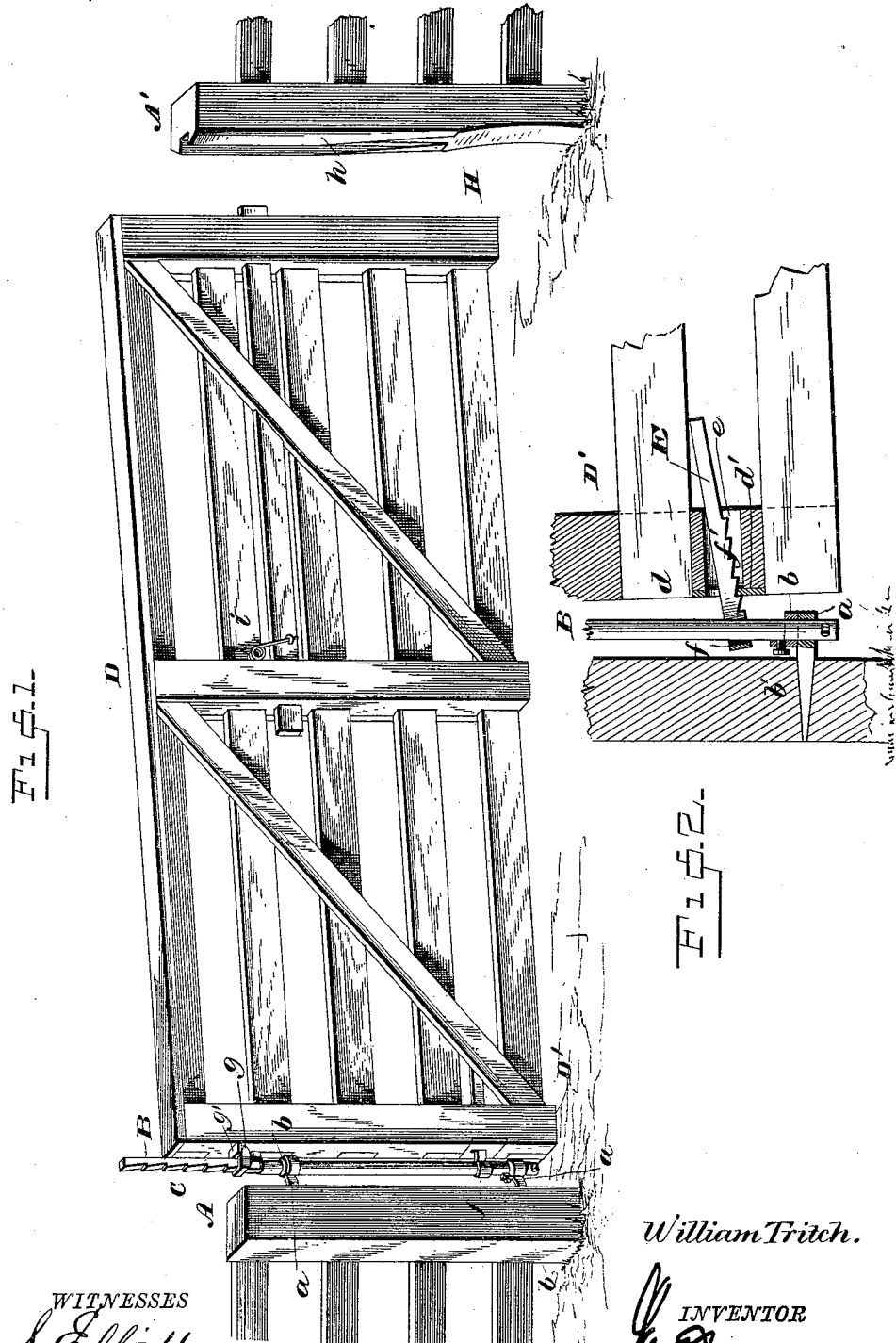

UNITED STATES PATENT OFFICE.

WILLIAM TRITCH, OF CORUNNA, INDIANA.

GATE.

SPECIFICATION forming part of Letters Patent No. 353,550, dated November 30, 1886.

Application filed August 12, 1886. Serial No. 210,715. (No model.)

*To all whom it may concern:*

Be it known that I, WILLIAM TRITCH, a citizen of the United States of America, residing at Corunna, in the county of De Kalb and State of Indiana, have invented certain new and useful Improvements in Gates; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in swinging gates, the object of my invention being to provide a means whereby the height of the gate may be varied and the inclination of the front portion changed so that small animals may readily pass under the same; also, so as to provide a means whereby the gate at the front end thereof may be elevated so that the same will close automatically; and to this end my invention consists in providing the gate-post upon which the gate is hung with a vertical bar, which is secured thereto by means of eyes, so that it will turn within the same, the upper portion of said bar being serrated, so as to engage with an eye attached to the upper portion of the gate, and the lower portion of the gate being attached to said bar by a serrated bar having an eye, so that the lower edge of the gate can be swung outwardly from the post.

My invention also consists in the construction and combination of the parts, as will be hereinafter fully set forth, and specifically pointed out in the claims.

In the accompanying drawings, which illustrate my invention, Figure 1 is a perspective view of a gate constructed in accordance with my invention, and Fig. 2 is a detail view, partly in section.

A refers to the gate-post upon which the gate is swung, and A' to the post against which the gate abuts when closed. The post A, near its upper and lower ends, is provided with eyes $a\ a$, which are rigidly secured to the post, and within these eyes $a\ a$ a vertical rod, B, is pivotally secured, said rod adjacent to the eyes $a\ a$ having collars $b\ b$ secured thereon in any suitable manner. The lower collar is preferably removably secured, and for this purpose is provided with a set-screw, $b'$, as fully shown in Fig. 2. The vertical rod B, at its lower end, is provided with a perforation, through which passes a key for preventing the removal of said bar by an upward movement. The upper end of the bar B is preferably rectangular in cross-section, and is provided at its rear edge with a series of serrations, $c$.

The gate D may be of ordinary construction, and the rear post, D', thereof has attached near its base a plate, $d$, which is centrally provided with a vertical slot, $d'$, in the rear of which the post is provided with a vertical slot, $e$, through which the bar E will pass. This bar E is provided at its end with an eye, $f$, which is of a slightly larger diameter than the bar B, and its lower edge is provided with a series of serrations, $f'$, which are adapted to engage with the lower edge of the slot in the plate $d$, so as to hold the lower end of the gate at an inclination with respect to the post A, thus tilting its forward end upwardly. The outer end of the bar is left plain, so as to form a handle, whereby said bar may be readily operated.

The upper portion of the post D' of the gate is provided with a rectangular eye, $g$, the lower edge of which is adapted to engage with the straight portion of one of the serrations $c$, so as to hold the gate at the desired height. Through the inner portion of the eye $g$ a wedge-shaped key, $g'$, is passed, so as to prevent movement of the eye upon the serrated portion of the bar when said key is in place; but this key may be readily removed from the eye when desired.

The post A', against which the gate D abuts, is curved at its lower portion, as shown at H, so that when the gate is tilted upwardly the lower end thereof will not abut against said post, but will allow the gate to swing past the same, and the upper portion of the post is provided with longitudinal side pieces, $h$, which are inclined at their outer edges, so that the latch of the gate when the same is swung will abut against the same and slide over said side pieces, so as to engage the central recess, and thus hold the gate closed, said sliding bar or latch being provided with a spring, $i$, for throwing the same outwardly.

By providing a gate with the means hereinbefore described the same may be adjusted vertically so as to be parallel with the ground; or the lower front end of the same may be elevated so that the front end will be elevated above the ground when the gate is closed, and when the parts are arranged so as to hold the gate in such a position the same will swing to a closed position automatically.

I am aware that it is not broadly new to provide a swinging gate with means for elevating the front end of the same, and I therefore do not claim such construction, broadly, but

What I claim as new, and desire to secure by Letters Patent, is—

1. In combination with a swinging gate, a supporting-post having a vertical bar pivotally secured thereto so as to be maintained in a vertical position, the upper end being provided with serrations $c$, a gate, D, the rear upright thereof having attached thereto an eye, $g$, which engages with the serrations $c$, and a serrated bar, F, loosely pivoted to the bar B, and adapted to engage with a plate attached near the lower end of the rear upright of the gate, substantially as shown, and for the purpose set forth.

2. In a swinging gate, a supporting-post, A, having eyes $a\ a$, which are adapted to support pivotally a vertical bar, B, said bar having its upper end serrated, as shown, in combination with the rear upright, D', of the gate, having an eye, $g$, attached thereto, said upright being provided near its lower end with a slotted plate, $d$, and a recess, and a bar, E, serrated on its lower edge to engage with the plate $d$, and loosely pivoted to the bar B, said bar E having an inwardly-projecting portion which forms a handle, substantially as shown, and for the purpose set forth.

In testimony whereof I affix my signature in presence of two witnesses.

WILLIAM TRITCH.

Witnesses:
THOMAS L. GRAVES,
AMOS E. KUNDERD.